United States Patent
Pan et al.

(10) Patent No.: US 12,541,615 B2
(45) Date of Patent: Feb. 3, 2026

(54) MULTI-PARTY DATA QUERY METHODS AND APPARATUSES FOR DATA PRIVACY PROTECTION

(71) Applicant: Alipay (Hangzhou) Information Technology Co., Ltd., Zhejiang (CN)

(72) Inventors: Wuqiong Pan, Hangzhou (CN); Tao Wei, Hangzhou (CN); Tingting Li, Hangzhou (CN); Tianyi Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 20 days.

(21) Appl. No.: 18/400,427

(22) Filed: Dec. 29, 2023

(65) Prior Publication Data

US 2024/0135026 A1    Apr. 25, 2024

Related U.S. Application Data

(63) Continuation of application No. PCT/CN2022/125462, filed on Oct. 14, 2022.

(30) Foreign Application Priority Data

Dec. 28, 2021    (CN) .......................... 202111621978.6

(51) Int. Cl.
    *G06F 21/62*    (2013.01)
(52) U.S. Cl.
    CPC ...... *G06F 21/6227* (2013.01); *G06F 21/6245* (2013.01)
(58) Field of Classification Search
    USPC ........................................................ 726/26
    See application file for complete search history.

(56) References Cited

U.S. PATENT DOCUMENTS 9,355,135 B2 *  5/2016  Bhide .................... G06F 16/23
9,442,694 B1    9/2016  Boehme et al.
(Continued)

FOREIGN PATENT DOCUMENTS

CN    106802926    6/2017
CN    112000979    11/2020
(Continued)

OTHER PUBLICATIONS

International Search Report and Written Opinion in International Appln. No. PCT/CN2022/125462, mailed on Dec. 27, 2022, 10 pages (with English translation).

(Continued)

*Primary Examiner* — Sanchit K Sarker
(74) *Attorney, Agent, or Firm* — Fish & Richardson P.C.

(57) ABSTRACT

Embodiments of this specification provide multi-party data query methods and apparatuses for data privacy protection. One implementation of the methods includes obtaining, from each of a plurality of data owners, attribute value ciphertexts of N target objects to form a ciphertext table, disordering the ciphertext table in units of rows to obtain a disordered table, sorting, in response to a query instruction of querying sorting-related data for a target attribute item in the plurality of attribute items, attribute value ciphertexts corresponding to the target attribute item in the disordered table to obtain a target sorted table, and obtaining the sorting-related data as a query result based on the target sorted table.

19 Claims, 6 Drawing Sheets

(56) References Cited

U.S. PATENT DOCUMENTS

| | | | |
|---|---|---|---|
| 11,924,321 B1* | 3/2024 | Boyd | H04L 9/0894 |
| 2005/0226408 A1* | 10/2005 | Hotz | H04L 9/0662 |
| | | | 380/28 |
| 2017/0053135 A1 | 2/2017 | Mattsson et al. | |
| 2019/0147770 A1* | 5/2019 | Yoshino | G06F 16/2246 |
| | | | 713/193 |
| 2019/0156051 A1* | 5/2019 | Beier | G06F 21/602 |
| 2020/0177366 A1 | 6/2020 | Han et al. | |

FOREIGN PATENT DOCUMENTS

| | | |
|---|---|---|
| CN | 112347501 | 2/2021 |
| CN | 112597524 | 4/2021 |
| CN | 112613077 | 4/2021 |
| CN | 112822201 | 5/2021 |
| CN | 112887297 | 6/2021 |
| CN | 113536379 | 10/2021 |
| CN | 114003962 | 2/2022 |
| CN | 114282256 | 4/2022 |
| CN | 114338017 | 4/2022 |
| CN | 114726514 | 7/2022 |
| CN | 115587382 | 1/2023 |
| EP | 3392864 | 10/2020 |

OTHER PUBLICATIONS

Li et al., "An AD-based private cloud storage access control scheme," Journal of University of Chinese Academy of Science, Sep. 30, 2015, 32(5): 676-681 (with English Abstract).

Xiang et al., "Research and Implementation of TLS Browser Supporting Commercial Cryptographic Algorithm," Netinfo Security, Apr. 30, 2017, (4): 26-33 (with English Abstract).

Extended European Search Report in European Appln. No. 22913664.3, mailed on Sep. 3, 2024, 9 pages.

International Preliminary Report on Patentability in International Appln. No. PCT/CN2022/125462, mailed on Jul. 11, 2024, 10 pages (with English translation).

* cited by examiner

MULTI-PARTY DATA QUERY METHODS AND APPARATUSES FOR DATA PRIVACY PROTECTION

CROSS-REFERENCE TO RELATED APPLICATIONS

This application is a continuation of PCT Application No. PCT/CN2022/125462, filed on Oct. 14, 2022, which claims priority to Chinese Patent Application No. 202111621978.6, filed on Dec. 28, 2021, and each application is hereby incorporated by reference in its entirety.

TECHNICAL FIELD

This specification relates to the field of data security technologies, and in particular, to multi-party data query methods and apparatuses for data privacy protection.

BACKGROUND

In the big data background, service data of different data parties often need to be comprehensively processed. For example, in a scenario of analyzing user information, party A holds physical condition data such as a height and a weight of a user, party B holds salary data of the user, and party C holds debit and credit data of the user. In a process of jointly processing data of a plurality of parities, protection and security of data privacy has become an issue worthy of concern.

During data processing, it is inevitable that data are sorted jointly. For example, party A needs to query a sum of salaries of users whose salaries rank in the top N, or needs to query debit and credit states of the users whose salaries rank in the top N, or needs to query a sum of salaries of users whose heights rank in the top M. In the above-mentioned cases, the data held by the three parties A, B, and C need to be sorted jointly, to obtain a data query result based on a corresponding sorting result. If the plurality of parties A, B, and C directly upload the private data of the user they hold to a third party in a plaintext form, after summarizing the data into a table, the third party sorts the corresponding data in the table to obtain a data query result needed by each party based on a sorting result. However, the private data of the user of each party may be leaked in the process.

Therefore, how to provide a method for implementing multi-party data query on the premise of protecting data privacy is an urgent problem to be resolved.

SUMMARY

One or more embodiments of this specification provide multi-party data query methods and apparatuses for data privacy protection, to protect private data of a plurality of parties.

According to a first aspect, a multi-party data query method for data privacy protection is provided. The multi-party includes a plurality of data owners, each of the plurality of data owners holds attribute values of several attribute items of N target objects, the method is performed by an intermediate party other than the multi-party, and the method includes following: Attribute value ciphertexts of the N target objects sent by each data owner are obtained to obtain a ciphertext table, where one row in the ciphertext table corresponds to one target object, and one column corresponds to one attribute item; the ciphertext table is disordered in units of rows to obtain a disordered table; and in response to a query instruction of querying sorting-related data for a target attribute item, attribute value ciphertexts corresponding to the target attribute item in the disordered table are sorted to obtain a target sorted table; and the sorting-related data are obtained as a query result based on the target sorted table.

In an optional implementation, the intermediate party is a cryptographic computing system including M executors.

That attribute value ciphertexts of the N target objects sent by each data owner are obtained includes following: Each of the M executors obtains one attribute value fragment sent by each data owner as an attribute value ciphertext, where each attribute value fragment is determined by dividing, by each data owner, an attribute value held by the data owner into M pieces.

That the ciphertext table is disordered in units of rows includes following: Each executor disorders, in combination with the other (M−1) executors, the ciphertext table in units of rows based on the attribute value ciphertext held by the party by using a secure multi-party computation (MPC) solution.

In an optional implementation, the sorting-related data are a calculation result of performing specified calculation on attribute value ciphertexts at specified X locations in a sorting sequence corresponding to the target attribute item.

That the sorting-related data are obtained as a query result includes following: Target attribute value ciphertexts at the specified X locations are obtained from the target sorted table; and the specified calculation is performed on the target attribute value ciphertexts.

In an optional implementation, that the ciphertext table is disordered in units of rows includes following: The ciphertext table is disordered by using at least one disordering procedure, where any current disordering procedure includes: determining, for each target subtable of the ciphertext table, at least one pair of rows to be swapped from the target subtable; and performing location swapping on each pair of rows to be swapped with a certain probability to obtain a disordered subtable corresponding to the target subtable; and determining an output table in the current round of disordering procedure based on the disordered subtable to form the disordered table.

In an optional implementation, the certain probability is determined based on a random number generated for the pair of rows to be swapped.

In an optional implementation, when the current disordering procedure is a first disordering procedure, the target subtable is the ciphertext table; and when the current disordering procedure is not the first disordering procedure, the target subtable is a table whose quantity of rows is not less than 2 in an output table corresponding to an above-mentioned disordering procedure.

In an optional implementation, that at least one pair of rows to be swapped is determined from the target subtable includes following: An iteration threshold is determined based on a quantity of rows in the target subtable; and a plurality of iteration processes are iteratively performed, where each iteration process includes: selecting at least one pair of rows to be swapped from the target subtable based on at least a current quantity of iterations until an iteration end condition related to the iteration threshold is satisfied.

In an optional implementation, that at least one pair of rows to be swapped is selected from the target subtable based on at least a current quantity of iterations includes following: A row whose corresponding row number is equal to the current quantity of iterations and a row whose corresponding row number is equal to a sum of the current quantity of iterations and the iteration threshold are respectively selected from the target subtable as a pair of rows to be swapped.

In an optional implementation, that an output table in the current round of disordering procedure is determined based on the disordered subtable includes following: The disordered subtable is divided by using the iteration threshold to determine the output table in the current round of disordering procedure.

In an optional implementation, a form of the iteration threshold is $2^m$, and m and the quantity n of rows in the target subtable satisfy the following condition: $2^m<n<=2^m+1$.

In an optional implementation, a row number corresponding to each row in the ciphertext table is represented in a binary way.

That at least one pair of rows to be swapped is selected from the target subtable based on at least a current quantity of iterations includes following: Two rows whose corresponding row numbers are the same in bits other than an ith bit are selected from the target subtable as a pair of rows to be swapped, where i is equal to the current quantity of iterations, and the target subtable is the ciphertext table.

In an optional implementation, that the attribute value ciphertexts corresponding to the target attribute item in the disordered table are sorted includes following: A plurality of sorting procedures are iteratively performed, where any sorting procedure includes: determining, for each table part currently to be sorted in the disordered table, a reference ciphertext from attribute value ciphertexts corresponding to the target attribute item included in the table part; grouping other attribute value ciphertexts corresponding to the target attribute item included in the table part based on the reference ciphertext, to obtain a first row set larger than the reference ciphertext and a second row set smaller than the reference ciphertext; and using a set whose quantity of rows is greater than 1 in the first row set and the second row set corresponding to each table part as a table part to be sorted corresponding to a next sorting procedure, until the target sorted table is obtained.

In an optional implementation, a third row set equal to the reference ciphertext is further obtained through the grouping.

In an optional implementation, the any sorting procedure further includes: arranging the first row set, the second row set, and the third row set corresponding to each table part, so that the first row set is placed below the third row set, and the second row set is placed above the third row set.

In an optional implementation, that the ciphertext table is disordered in units of rows includes following: Whether a total quantity of rows in the ciphertext table satisfies a predetermined disordering condition is determined, where the predetermined disordering condition includes: a total quantity of rows is equal to an integer power of a predetermined value; the ciphertext table is filled with a specific row to obtain a filled table if it is determined that the predetermined disordering condition is not satisfied, where a total quantity of rows in the filled table satisfies the predetermined disordering condition; and the filled table is disordered in units of rows to obtain the disordered table.

In an optional implementation, that a target sorted table is obtained includes following: The attribute value ciphertexts corresponding to the target attribute item in the disordered table are sorted to obtain a sorted table; and the specific row filled in the sorted table is removed to obtain the target sorted table.

According to a second aspect, a multi-party data query apparatus for data privacy protection is provided. The multi-party includes a plurality of data owners, each of the plurality of data owners holds attribute values of several attribute items of N target objects, the apparatus is deployed in an intermediate party other than the multi-party, and the apparatus includes: an acquisition module, configured to obtain attribute value ciphertexts of the N target objects sent by each data owner to obtain a ciphertext table, where one row in the ciphertext table corresponds to one target object, and one column corresponds to one attribute item; a disordering module, configured to disorder the ciphertext table in units of rows to obtain a disordered table; a sorting module, configured to sort, in response to a query instruction of querying sorting-related data for a target attribute item, attribute value ciphertexts corresponding to the target attribute item in the disordered table to obtain a target sorted table; and a query module, configured to obtain the sorting-related data as a query result based on the target sorted table.

In an optional implementation, the intermediate party is a cryptographic computing system including M executors.

The acquisition module is specifically configured to be used by each of the M executors to obtain one attribute value fragment sent by each data owner as an attribute value ciphertext, where each attribute value fragment is determined by dividing, by each data owner, an attribute value held by the data owner into M pieces.

The disordering module is specifically configured to be used by each executor to disorder, in combination with the other (M−1) executors, the ciphertext table in units of rows based on the attribute value ciphertext held by the party by using a secure multi-party computation (MPC) solution.

In an optional implementation, the sorting-related data are a calculation result of performing specified calculation on attribute value ciphertexts at specified X locations in a sorting sequence corresponding to the target attribute item.

The query module is specifically configured to obtain target attribute value ciphertexts at the specified X locations from the target sorted table; and perform the specified calculation on the target attribute value ciphertexts.

In an optional implementation, the disordering module is specifically configured to disorder the ciphertext table by using at least one disordering procedure, where the disordering module performs any current disordering procedure by using the following units: a first determining unit, configured to determine, for each target subtable of the ciphertext table, at least one pair of rows to be swapped from the target subtable; a location swapping unit, configured to perform location swapping on each pair of rows to be swapped with a certain probability to obtain a disordered subtable corresponding to the target subtable; and a second determining unit, configured to determine an output table in the current round of disordering procedure based on the disordered subtable to form the disordered table.

In an optional implementation, the certain probability is determined based on a random number generated for the pair of rows to be swapped.

In an optional implementation, when the current disordering procedure is a first disordering procedure, the target subtable is the ciphertext table; and when the current disordering procedure is not the first disordering procedure, the target subtable is a table whose quantity of rows is not less than 2 in an output table corresponding to an above-mentioned disordering procedure.

In an optional implementation, the first determining unit is specifically configured to determine an iteration threshold based on a quantity of rows in the target subtable; and iteratively perform a plurality of iteration processes, where each iteration process includes: selecting at least one pair of rows to be swapped from the target subtable based on at least a current quantity of iterations until an iteration end condition related to the iteration threshold is satisfied.

In an optional implementation, the first determining unit is specifically configured to respectively select, from the target subtable, a row whose corresponding row number is equal to the current quantity of iterations and a row whose corresponding row number is equal to a sum of the current quantity of iterations and the iteration threshold as a pair of rows to be swapped.

In an optional implementation, the second determining unit is specifically configured to divide the disordered subtable by using the iteration threshold to determine the output table in the current round of disordering procedure.

In an optional implementation, a form of the iteration threshold is $2^m$, and m and the quantity n of rows in the target subtable satisfy the following condition: $2^m < n <= 2^m+1$.

In an optional implementation, a row number corresponding to each row in the ciphertext table is represented in a binary way.

The first determining unit is specifically configured to select, from the target subtable, two rows whose corresponding row numbers are the same in bits other than an ith bit, where i is equal to the current quantity of iterations, and the target subtable is the ciphertext table.

In an optional implementation, the sorting module is specifically configured to iteratively perform a plurality of sorting procedures, where any sorting procedure includes: determining, for each table part currently to be sorted in the disordered table, a reference ciphertext from attribute value ciphertexts corresponding to the target attribute item included in the table part; grouping other attribute value ciphertexts corresponding to the target attribute item included in the table part based on the reference ciphertext, to obtain a first row set larger than the reference ciphertext and a second row set smaller than the reference ciphertext; and using a set whose quantity of rows is greater than 1 in the first row set and the second row set corresponding to each table part as a table part to be sorted corresponding to a next sorting procedure, until the target sorted table is obtained.

In an optional implementation, a third row set equal to the reference ciphertext is further obtained through the grouping.

In an optional implementation, the sorting module is further specifically configured to arrange the first row set, the second row set, and the third row set corresponding to each table part, so that the first row set is placed below the third row set, and the second row set is placed above the third row set.

In an optional implementation, the disordering module includes: a determining unit, configured to determine whether a total quantity of rows in the ciphertext table satisfies a predetermined disordering condition, where the predetermined disordering condition includes: a total quantity of rows is equal to an integer power of a predetermined value; a filling unit, configured to fill the ciphertext table with a specific row to obtain a filled table if it is determined that the predetermined disordering condition is not satisfied, where a total quantity of rows in the filled table satisfies the predetermined disordering condition; and a disordering unit, configured to disorder the filled table in units of rows to obtain the disordered table.

In an optional implementation, the sorting module is specifically configured to: sort the attribute value ciphertexts corresponding to the target attribute item in the disordered table to obtain a sorted table; and remove the specific row filled in the sorted table to obtain the target sorted table.

According to a third aspect, a computer-readable storage medium is provided. The computer-readable storage medium stores a computer program, and when the computer program is executed in a computer, the computer is enabled to perform the method according to the first aspect.

According to a fourth aspect, a computing device is provided, including a memory and a processor. The memory stores executable code, and the processor executes the executable code to implement the method according to the first aspect.

According to the methods and the apparatuses provided in the embodiments of this specification, each data owner sends the attribute value ciphertext to the intermediate party to avoid leakage of the attribute value. In addition, after obtaining the ciphertext table constructed by using the attribute value ciphertext sent by each data owner, the intermediate party first disorders the ciphertext table in units of rows to scramble an order relationship between rows in the ciphertext table to obtain the disordered table, and then sorts the attribute value ciphertexts corresponding to the target attribute item in the disordered table. Even if attribute value ciphertexts corresponding to a plurality of target attribute items in the ciphertext table are sorted, because the order relationship between the rows in the table needs to be scrambled before sorting is performed for any target attribute item, locations of the rows in the table cannot be tracked during each time of sorting, thereby avoiding exposure of an order relationship between the rows in the table in a sorting sequence (for example, a target object ranks at an $a^{th}$ location in a sorting sequence of a first attribute item is a target object ranks at a $b^{th}$ location in a sorting sequence of a second attribute item).

BRIEF DESCRIPTION OF DRAWINGS

To describe the technical solutions in the embodiments of this application more clearly, the following briefly describes the accompanying drawings needed for describing the embodiments. Clearly, the accompanying drawings in the following description merely illustrate some embodiments of this application, and a person of ordinary skill in the art can derive other drawings from these accompanying drawings without creative efforts.

DESCRIPTION OF EMBODIMENTS

Figure 1A:
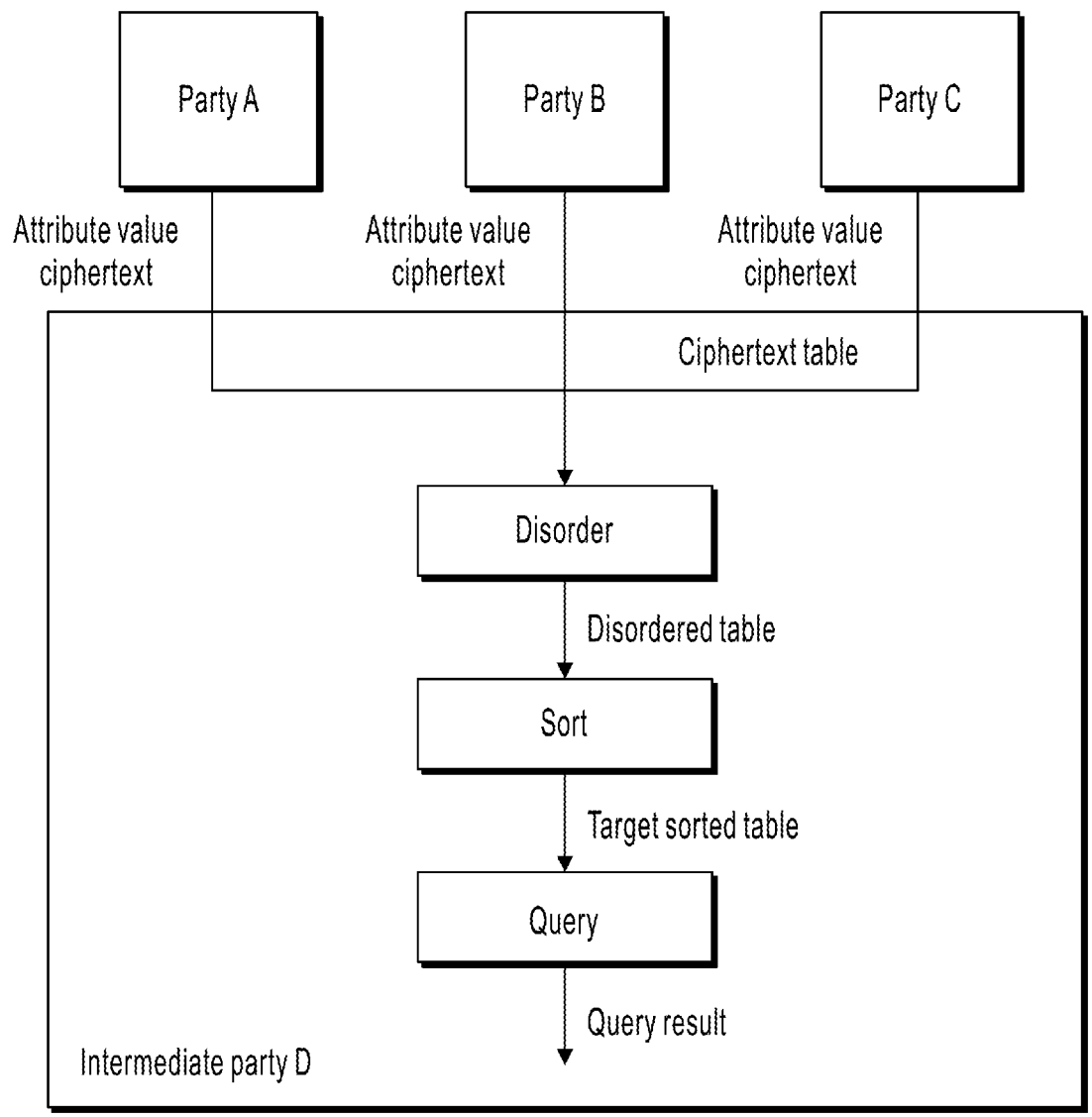
FIG. 1A is a schematic diagram illustrating an implementation framework, according to one or more embodiments disclosed in this specification.

The following describes the technical solutions in the embodiments of this specification in detail with reference to the accompanying drawings.

As described above, in a process of jointly processing data by a plurality of parities, security of data privacy has become an issue of great concern currently. During specific data processing, it is inevitable that data are sorted jointly. For example, in a scenario of analyzing user information, party A holds attribute values of physical condition attributes such as a height and a weight of a user, party B holds an attribute value (a specific salary amount) of a salary attribute of the user, and party C holds an attribute value (a specific debit and credit amount) of a debit and credit attribute of the user. When party A needs to query a sum of salaries of users whose salaries rank in the top N, or needs to query debit and credit states of users whose salaries rank in the top N, or needs to query a sum of salaries of users whose heights rank in the top M and a sum of salaries of users whose weights rank in the top M, or in a case of another query need, the data held by the three parties A, B, and C need to be sent to a third party. The third party performs joint sorting based on the data sent by the three parties A, B, and C, and then obtains a data query result based on a corresponding sorting result.

When performing joint sorting on the data sent by the three parties A, B, and C during data query, the third party can use a current existing sorting method based on an order-preserving encryption method. In the sorting method, the third party obtains an attribute value ciphertext uploaded by each party (A, B, and C) to obtain a table to be sorted. A user identifier and an attribute value of each attribute item in the table are in a ciphertext form (for example, one row in the table stores attribute value ciphertexts of one user for a plurality of attribute items, and one column stores attribute value ciphertexts of users for one attribute item), but an order relationship between rows is in a plaintext form. Subsequently, the third party directly sorts attribute value ciphertexts of a target attribute item in the table based on a query request indicating to perform sorting for the target attribute item.

In the above-mentioned data query process, in a process that the third party sorts the data by using the above-mentioned sorting method, when the attribute value ciphertexts in a plurality of columns (a plurality of target attribute items) in the table are sorted, an order relationship between the rows in the table in a sorting sequence may expose. For example, the target attribute item includes a weight attribute item and a salary attribute item of the user, and after the third party respectively sorts attribute value ciphertexts of the weight attribute item and the salary attribute item in the table, the third party may obtain personal private information, for example, information indicating that a person whose weight ranks the fifth has a salary that ranks the first, which is not allowed when private data are kept confidential.

Therefore, the processing method provided in the embodiments of this specification is mainly designed for a scenario of data query by a plurality of parties holding private data (attribute values of several attribute items of N target objects).

FIG. 1A is a schematic diagram illustrating an implementation scenario, according to one or more embodiments disclosed in this specification. This implementation scenario shows a plurality of data owners, such as party A, party B, and party C, and intermediate party D, where intermediate party D can be implemented by a cryptographic computing system. Each data owner and the intermediate party each both can be specifically a device, a platform, a server, or a device cluster that has a computing and processing capability. Each data owner holds private data of the party, that is, attribute values of several attribute items of N target objects. Intermediate party D is configured to receive attribute value ciphertexts of the N target objects sent by each data owner (that is, party A, party B, and party C) to form a ciphertext table, and then performs a subsequent data query procedure. Each data owner does not want to leak the data (the attribute values of the several attribute items of the N target objects) held by the data owner, and does not want to expose an order relationship between rows (the attribute values of the target objects) in a sorting sequence.

Therefore, according to the embodiments of this specification, each data owner performs corresponding processing on the attribute values of the several attribute items of the N target objects that are held by the data owner based on a data upload need of intermediate party D, to obtain attribute value ciphertexts of the attribute values. Then, each data owner uploads attribute value ciphertexts of the data owner to intermediate party D. Intermediate party D obtains the attribute value ciphertexts of the N target objects sent by each data owner to obtain a ciphertext table. One row in the ciphertext table corresponds to one target object, and one column corresponds to one attribute item, that is, one row in the ciphertext table stores attribute value ciphertexts of one target object for a plurality of attribute items, and one column stores attribute value ciphertexts of the target objects for one attribute item. The ciphertext table can be shown in Table 1 below.

TABLE 1

| | Attribute item 1 | Attribute item 2 | Attribute item 3 | Attribute item 4 | ... | Attribute item V |
|---|---|---|---|---|---|---|
| Identifier of target object 1 (ciphertext) | Attribute value ciphertext 11 | Attribute value ciphertext 12 | Attribute value ciphertext 13 | Attribute value ciphertext 14 | ... | Attribute value ciphertext 1V |
| ... | ... | ... | ... | ... | ... | ... |
| Identifier of target object N (ciphertext) | Attribute value ciphertext N1 | Attribute value ciphertext N2 | Attribute value ciphertext N3 | Attribute value ciphertext N4 | ... | Attribute value ciphertext NV |

Intermediate party D disorders the ciphertext table in units of rows, that is, disorders the ciphertext table to scramble an order relationship between rows in the ciphertext table, so that locations of the rows in the ciphertext table cannot be tracked, and a table after the disordering is obtained, that is, a disordered table.

Intermediate party D sorts, in response to a query instruction of querying sorting-related data for a target attribute item, attribute value ciphertexts corresponding to the target attribute item in the disordered table to obtain a target sorted table, where rows in the target sorted table can be sorted in descending order (or ascending order) of the attribute value ciphertexts corresponding to the target attribute item; obtains the sorting-related data as a query result based on the target sorted table; and then, feeds back the query result to a query instruction initiating party.

It can be understood that, that intermediate party D sorts, in response to the query instruction, the attribute value ciphertexts corresponding to the target attribute item in the disordered table can be used as an intermediate procedure for determining the query result corresponding to the query instruction. In this case, the target sorted table obtained through sorting is usually not fed back to the query instruction initiating party.

Figure 1B:
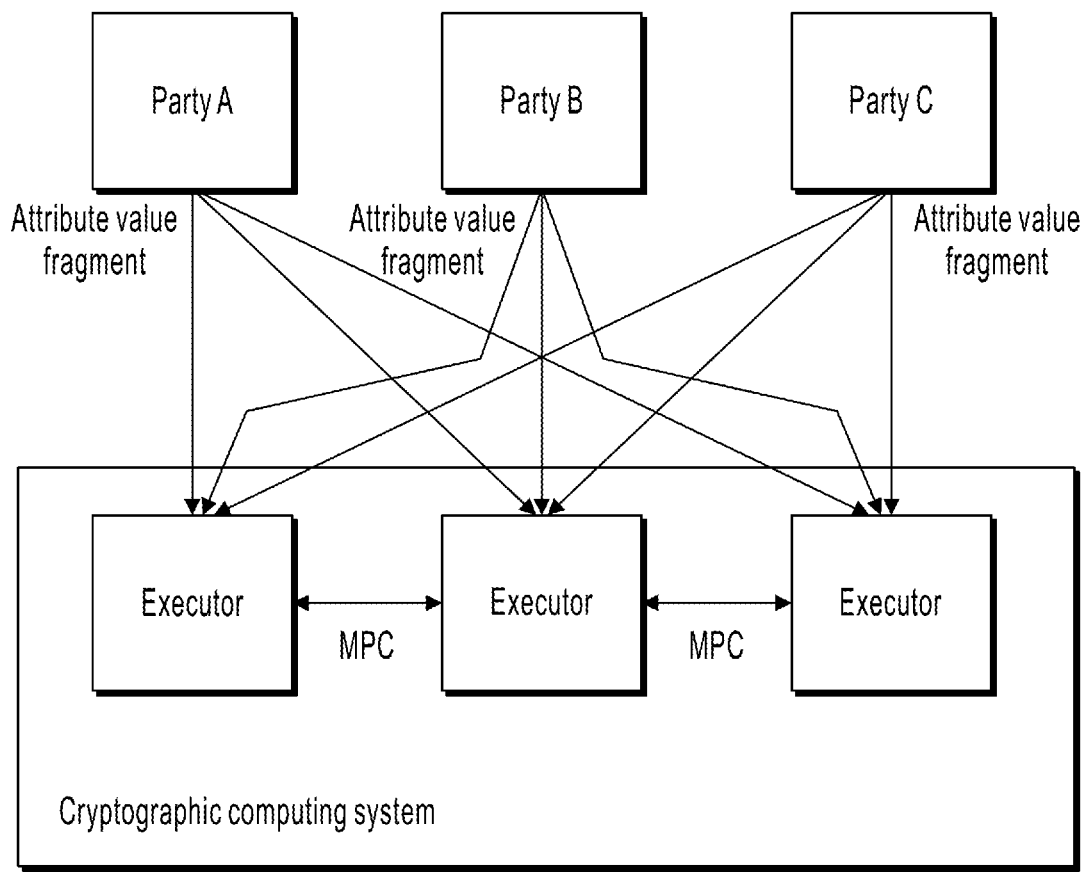
FIG. 1B is a schematic diagram illustrating an implementation framework, according to one or more embodiments disclosed in this specification.

In an implementation, intermediate party D can be implemented by a cryptographic computing system including M executors. The M executors can run in a trusted execution environment (TEE), and one executor can be implemented by one TEE. In this case, the executor can be referred to as a trusted executor. In another case, the M executors can also run in a common execution environment. As shown in FIG. 1B, the quantity M of executors can be set to 3. Each data owner divides each attribute value held by the data owner into three pieces to obtain three attribute value fragments corresponding to the attribute value. Each data owner sends each attribute value fragment corresponding to each attribute value held by the data owner to each executor. Each of the three executors obtains one attribute value fragment sent by each data owner as an attribute value ciphertext, and disorders, in combination with the other two executors, the ciphertext table in units of rows based on the attribute value ciphertext held by the party by using a secure multi-party computation (MPC) solution.

Each executor obtains a part (attribute value fragment) of the attribute value, and each executor cannot obtain an attribute value plaintext, so that the attribute value plaintext can be prevented from being leaked to each executor. In addition, if a certain executor or executors whose quantity is less than or equal to a specified quantity are successfully attacked, because the executor obtains only a part of the attribute value, an attacker cannot obtain the attribute value plaintext of each data owner by using the successfully attacked executor.

In addition, when each executor runs in the TEE, the cryptographic computing system protects the data of the executor at a higher degree and has a better anti-attack capability.

In the embodiments, because the order relationship between the rows in the table needs to be scrambled before sorting is performed for any target attribute item, locations of the rows in the table cannot be tracked during each time of sorting, thereby avoiding exposure of an order relationship between the rows in the table in a sorting sequence (for example, a target object ranks at an $a^{th}$ location in a sorting sequence of a first attribute item is a target object ranks at a $b^{th}$ location in a sorting sequence of a second attribute item).

With reference to specific embodiments, the following describes in detail the multi-party data query method for data privacy protection provided in this specification.

Figure 2:
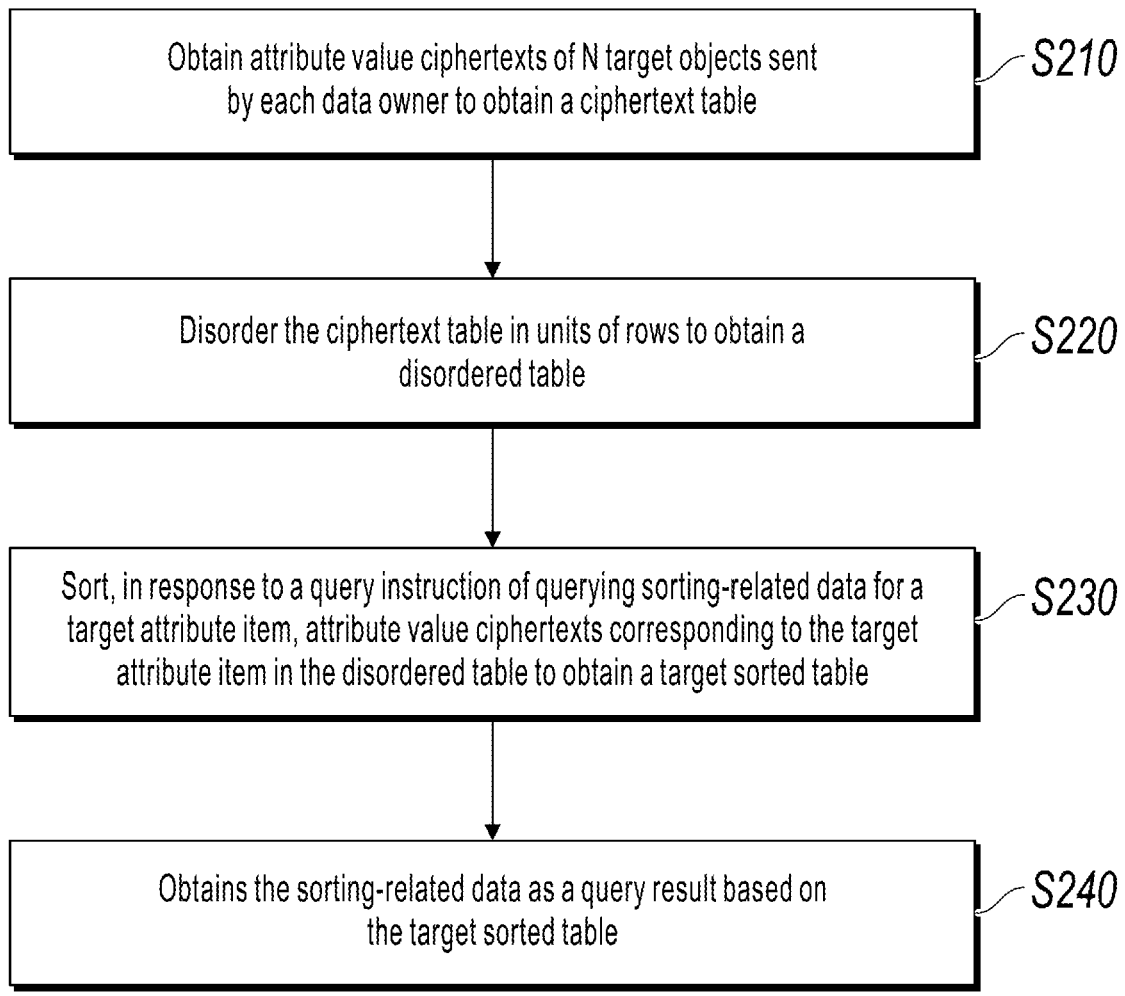
FIG. 2 is a schematic flowchart illustrating a multi-party data query method for data privacy protection, according to one or more embodiments.

FIG. 2 is a flowchart illustrating a multi-party data query method for data privacy protection, according to one or more embodiments of this specification. The multi-party includes a plurality of data owners, each of the plurality of data owners holds attribute values of several attribute items of N target objects, and the method is performed by an intermediate party other than the multi-party. The method includes the following steps S210 to S240:

S210: Obtain attribute value ciphertexts of the N target objects sent by each data owner to obtain a ciphertext table, where one row in the ciphertext table corresponds to one target object, and one column corresponds to one attribute item, that is, one row in the ciphertext table stores attribute value ciphertexts of one target object for a plurality of attribute items, and one column stores attribute value ciphertexts of the target objects for one attribute item.

In an implementation, before the plurality of data owners Ai send the attribute values of the N target objects held by the plurality of data owners to the intermediate party based on a data upload need of the intermediate party, to ensure effective execution of a data query procedure on the intermediate party side, the plurality of data owners Ai need to align the attribute values of the N target objects. The alignment can be that the plurality of data owners $A_i$ arrange the attribute values of the attribute items of the target objects in a predetermined order of arranging the target objects. For example, attribute values of all attribute items of target object 1 are located in a first row, and attribute values of all attribute items of target object 2 are located in a second row. By analogy, attribute values of all attribute items of target object N are located in an $N^{th}$ row. In an implementation, the target object can be one of the following: a user or an article.

It can be understood that, when sending the aligned attribute value ciphertexts of the several attribute items of the N target objects to the intermediate party, each data owner Ai further needs to send object identifier ciphertexts corresponding to the N target objects to the intermediate party.

S220: Disorder the ciphertext table in units of rows to obtain a disordered table. The intermediate party can disorder the ciphertext table in units of rows based on a predetermined disordering solution or randomly, that is, scramble an order relationship between rows in the ciphertext table to obtain the disordered table. In the disordered table, attribute value ciphertexts of which target object for a plurality of attribute items are stored in each row cannot be learned; and in each row in the disordered table, a mapping relationship between the target object and the attribute value ciphertext of each attribute item corresponding to the target object remains unchanged.

S230: Sort, in response to a query instruction of querying sorting-related data for a target attribute item, attribute value ciphertexts corresponding to the target attribute item in the disordered table to obtain a target sorted table, where the query instruction can be initiated by any data owner or can be initiated by a user who uses a service jointly provided by the plurality of data owners, and the service is related to the attribute values of the target objects held by the plurality of data owners; and the query instruction includes at least information indicating to sort the attribute value ciphertexts of the target attribute item, that is, a query result corresponding to the query instruction is the sorting-related data, and needs to be determined by using a result of sorting the attribute value ciphertexts corresponding to the target attribute item.

Rows in the target sorted table obtained after sorting are sorted in descending order (or ascending order) of the attribute value ciphertexts corresponding to the target attribute item. For example, in the target sorted table, a row including a largest attribute value ciphertext corresponding to the target attribute item is located in a first row, and a row including a second largest attribute value ciphertext corresponding to the target attribute item is located in a second row. By analogy, a row including a smallest attribute value ciphertext corresponding to the target attribute item is located in an $N^{th}$ row. On the contrary, in the target sorted table, the row including the smallest attribute value ciphertext corresponding to the target attribute item is located in the first row, and a row including a second smallest attribute value ciphertext corresponding to the target attribute item is located in the second row. By analogy, the row including the largest attribute value ciphertext corresponding to the target attribute item is located in the $N^{th}$ row.

S240: Obtain the sorting-related data as a query result based on the target sorted table. After obtaining the target sorted table, the intermediate party can obtain a sorting order between the attribute value ciphertexts corresponding to the target attribute item; perform a series of logical analysis in the sorting order based on the query instruction to obtain the sorting-related data, that is, the query result corresponding to the query instruction; and send the query result to a query instruction initiating party.

In an implementation of this specification, the sorting-related data are a calculation result of performing specified calculation on attribute value ciphertexts at specified X locations in a sorting sequence corresponding to the target attribute item.

S240 can include: Step 01: Obtain target attribute value ciphertexts at the specified X locations from the target sorted table. Step 02: Perform the specified calculation on the target attribute value ciphertexts.

The specified calculation includes but is not limited to calculation such as summation, averaging, continuous multiplication, and comparison.

In this case, a data holder initiating the query instruction can be a data holder that does not hold the target attribute item.

For example, the plurality of data owners are respectively party A, party B, and party C, and the target objects are respectively user 1 to user N. Party A holds attribute values of physical condition attribute items such as heights, weights, and ages of user 1 to user N, party B holds attribute values (specific salary amounts) of salary attribute items and attribute values (specific quantities of years) of service year attribute items of user 1 to user N, and party C holds attribute values (specific debit and credit amounts) of debit and credit attribute items of user 1 to user N.

The query instruction is sent by party A, and is used to query a sum of salaries of users rank in the top 10 in terms of salary attribute item. Correspondingly, the sorting-related data are a calculation result of performing summation calculation on attribute value ciphertexts (salary amount ciphertexts) rank in the top 10 in a sorting sequence corresponding to the salary attribute item. The intermediate party obtains attribute value ciphertexts of user 1 to user N uploaded by the three parties A, B, and C to obtain a ciphertext table; disorders the ciphertext table in units of rows to obtain a disordered table; sorts attribute value ciphertexts corresponding to the salary attribute item in the disordered table to obtain a target sorted table; determines attribute value ciphertexts ranking in the top 10, that is, salary amount ciphertexts ranking in the top 10, from attribute value ciphertexts corresponding to the salary attribute item in the target sorted table, and uses the attribute value ciphertexts as target attribute value ciphertexts; performs cryptographic summation on the target attribute value ciphertexts to obtain a salary sum ciphertext, that is, a query result; and subsequently sends the query result to party A.

In another implementation, the sorting-related data are a result of performing specific calculation on attribute value ciphertexts corresponding to specified attribute items of target objects at specified h locations in the sorting sequence corresponding to the target attribute item, and the specified attribute item is an attribute item different from the target attribute item. In this case, a data holder initiating the query instruction can be a data holder that does not hold the specified attribute item and/or the target attribute item.

In this implementation, the intermediate party determines attribute value ciphertexts at specified Y locations from the attribute value ciphertexts corresponding to the specified attribute item in the target sorted table, and performs the specified calculation on the attribute value ciphertexts at the specified Y locations to obtain a calculation result as a query result. The above-mentioned example continues to be used. Party A needs to query a sum of debit and credit amounts of users whose salaries rank in the top Y. Correspondingly, the query instruction is sent by party A, and is used to query a sum of attribute value ciphertexts (that is, a sum of debit and credit amounts) corresponding to debit and credit attributes of users rank in the top 10 in terms of salary attribute item. In other words, the query instruction is used to query a sum of attribute value ciphertexts of debit and credit attribute items of users rank in the top 10 in a sorting sequence corresponding to the salary attribute item in a sorted table (a target sorted table) corresponding to the salary attribute item.

Correspondingly, the intermediate party sorts attribute value ciphertexts corresponding to the salary attribute item in the disordered table to obtain the sorted table corresponding to the salary attribute item, that is, the target sorted table; determines, from the target sorted table, the users rank in the top 10 in the sorting sequence corresponding to the salary attribute item as target users, and determines attribute value ciphertexts of debit and credit attribute items corresponding to the target users; and further performs summation on the determined attribute value ciphertexts of the debit and credit attribute items to obtain a summation result as a query result.

In another implementation, the query instruction can be further used to query a result of comparison between a first calculated value and a second calculated value. The first calculated value is determined based on attribute value ciphertexts corresponding to a specified attribute item at specified h locations in a sorted table corresponding to a first attribute item and a first calculation method, and the second calculated value is determined based on attribute value ciphertexts corresponding to the specified attribute item at specified h locations in a sorted table corresponding to a second attribute item and the first calculation method. In other words, the sorting-related data are a calculation result of performing specific calculation on attribute value ciphertexts corresponding to specified attribute items of target objects at the specified h locations in the sorting sequence corresponding to the first attribute item and attribute value ciphertexts corresponding to the specified attribute items of the target objects at the specified h locations in the sorting sequence corresponding to the second attribute item. Both the first attribute item and the second attribute item are used as target attribute items.

The first attribute item, the second attribute item, and the specified attribute item are different from each other. In this case, a data holder initiating the query instruction can be a data holder that does not hold any data of the specified attribute item, the first attribute item, and/or the second attribute item.

In the above-mentioned case, before performing sorting for each target attribute item (that is, the first attribute item or the second attribute item), the intermediate policy needs to disorder a table to be sorted (for example, the ciphertext table or a table obtained in above-mentioned sorting) needs to be disordered. Specifically, the intermediate party first performs sorting for the first attribute item used as the target attribute item, that is, sorts attribute value ciphertexts corresponding to the first attribute item in the disordered table to obtain a first target sorted table; determines, from the first target sorted table, target objects at specified h locations in a sorting sequence corresponding to the first attribute item, and uses the target objects as a first group of objects; determines, from the first target sorted table, attribute value ciphertexts corresponding to specified attribute items of the first group of objects as a first group of attribute value ciphertexts; and obtains the first calculated value based on the first group of attribute value ciphertexts and the first calculation method.

Afterwards, the intermediate party performs sorting for the second attribute item used as the target attribute item, that is, disorders the ciphertext table (or the first target sorted table) again in units of rows to obtain a first disordered table; sorts, in response to the query instruction, attribute value ciphertexts corresponding to the second attribute item in the first table to obtain a second target sorted table; then, determines, from the second target sorted table, target objects at specified h locations in a sorting sequence corresponding to the second attribute item as a second group of objects, and determines attribute value ciphertexts corresponding to specified attribute items of the second group of objects from the second target sorted table as a second group of attribute value ciphertexts; and obtains the second calculated value based on the second group of attribute value ciphertexts and the first calculation method.

The intermediate party compares the first calculated value with the second calculated value to obtain a comparison result (that is, the sorting-related data) as a query result, and feeds back the query result to a query instruction initiating party.

The above-mentioned example continues to be used. The query result represents that party A needs to query a sum of salaries of the first 10 users in a sorting sequence corresponding to the height (the first attribute item) and a sum of salaries of the first 10 users in a sorting sequence corresponding to the weight (the second attribute item), where both the height attribute item and the weight attribute item are target attribute items. In other words, the query result represents that sorting needs to be separately performed for the height attribute item and the weight attribute item. The sorting-related data are a result of comparing a sum of salaries of users whose heights rank in the top 10 in the sorting sequence corresponding to the height attribute item and a sum of salaries of users whose weights rank in the top 10 in the sorting sequence corresponding to the weight attribute item.

Correspondingly, the intermediate party sorts attribute value ciphertexts corresponding to the height attribute item in the disordered table to obtain a sorted table corresponding to the height attribute item, that is, a first target sorted table; determines, from the first target sorted table, attribute value ciphertexts corresponding to salary attribute items of the users whose heights rank in the top 10, and uses the attribute value ciphertexts as a first group of attribute value ciphertexts; and further performs cryptographic summation on the first group of attribute value ciphertexts to obtain a first sum value. Afterwards, the intermediate party disorders the ciphertext table (or the first target sorted table) in units of rows to obtain a first disordered table; sorts, in response to the query instruction, attribute value ciphertexts corresponding to the weight attribute item in the first table to obtain a second target sorted table; determines, from the second sorted table, attribute value ciphertexts corresponding to salary attribute items of the users whose weights rank in the top 10, and uses the attribute value ciphertexts as a second group of attribute value ciphertexts; performs cryptographic summation on the second group of attribute value ciphertexts to obtain a second sum value; and compares the first sum value with the second sum value to obtain a query result (that is, the sorting-related data).

In the embodiments, because the order relationship between the rows in the table needs to be scrambled before sorting is performed on any target attribute item, locations of the rows in the table cannot be tracked during each time of sorting, thereby avoiding exposure of an order relationship between the rows in the table in a sorting sequence (for example, a target object ranks at an $a^{th}$ location in a sorting sequence of a first attribute item is a target object ranks at a $b^{th}$ location in a sorting sequence of a second attribute item). Correspondingly, the intermediate party serving as the third party cannot obtain the order relationship between the rows in the table in the sorting sequence when the intermediate party cannot obtain attribute value plaintexts.

In other embodiments of this specification, considering protection of private data (attribute values) of each data owner, the intermediate party is a cryptographic computing system including M executors. The executor can correspondingly run in a trusted execution environment (TEE), and the cryptographic computing system is a trusted cryptographic computing (TECC) system. Alternatively, the executor can run in a common execution environment.

Each data owner divides each attribute value held by the data owner into M pieces to obtain M attribute value fragments corresponding to the attribute value. Each data owner sends each attribute value fragment corresponding to each attribute value held by the data owner to each executor. Correspondingly, S210 is set as follows: Each of the M executors obtains one attribute value fragment sent by each data owner as an attribute value ciphertext, where each attribute value fragment is determined by dividing, by each data owner, an attribute value held by the data owner into M pieces.

Further, S220 is set as follows: Each executor disorders, in combination with the other (M−1) executors, the ciphertext table in units of rows based on the attribute value ciphertext held by the party by using a secure multi-party computation (MPC) solution.

In the embodiments, each executor obtains a part (attribute value fragment) of the attribute value, and each executor cannot obtain an attribute value plaintext, so that the attribute value plaintext can be prevented from being leaked to each executor.

When disordering the ciphertext table in units of rows, the intermediate party can use any method that can be used to disorder the table in a related technology, or can disorder the table by using a subsequent disordering method provided in this specification. The following describes in detail a method for disordering the ciphertext table.

In one or more embodiments of this specification, S220 can include the following steps: The ciphertext table is disordered by using at least one disordering procedure, where any current disordering procedure can include the following step 11 to step 13:

Step 11: Determine, for each target subtable of the ciphertext table, at least one pair of rows to be swapped from the target subtable.

Step 12: Perform location swapping on each pair of rows to be swapped with a certain probability to obtain a disordered subtable corresponding to the target subtable.

Step 13: Determine an output table in the current round of disordering procedure based on the disordered subtable to form the disordered table.

In an implementation, the certain probability is determined based on a random number generated for the pair of rows to be swapped. To be specific, after determining at least one pair of rows to be swapped from the target subtable, the intermediate party generates a random number for each pair of rows to be swapped, and performs location swapping based on the random number. In a case, the random number can be a first value or a second value; the first value can be 1, indicating to swape locations of corresponding rows to be swapped; and the second value can be 0, indicating not to swap locations of corresponding rows to be swapped. In another case, the random number can be a value between 0 and 1, and a larger random value indicates a larger probability of swapping locations of corresponding rows to be swapped. It can be understood that, the swapping locations of corresponding rows to be swapped mentioned in this specification means swapping attribute value ciphertexts of target objects stored in each pair of rows to be swapped. For example, it is determined that locations of a first row and a fourth row need to be swapped, that is, an attribute value ciphertext of a target object stored in the first row is stored in the fourth row, and an attribute value ciphertext of a target object stored in the fourth row is stored in the first row.

In a case, the intermediate party is implemented by a cryptographic computing system including M executors, and the random number generated for each pair of rows to be swapped is determined by each of the M executors in combination with the other (M−1) executors by using an MPC solution based on a random number fragment generated by the executor. As such, each executor generates only a fragment of the random number, and cannot know the random number. Correspondingly, each executor cannot know whether locations of each pair of rows to be swapped are actually swapped.

In an implementation, the intermediate party can pre-store a disordering procedure threshold. Correspondingly, in a first disordering procedure, the cryptographic computing system can directly use the ciphertext table as the target subtable; or can determine at least one target subtable from the ciphertext table, where each target subtable includes at least two consecutive rows.

Subsequently, the intermediate policy determines, for each target subtable, at least one pair of rows to be swapped from the target subtable, and performs location swapping on each pair of rows to be swapped with a certain probability to obtain a disordered subtable corresponding to the target subtable. Afterwards, the intermediate party obtains disordered subtables corresponding to all target subtables in the current round of disordering procedure, and determines the output table in the current round of disordering procedure based on the disordered subtables corresponding to all the target subtables.

When a quantity of performed disordering procedures does not reach the disordering procedure threshold, in a case, the output table (a ciphertext table obtained after some rows are disordered) in the current round of disordering procedure can be directly used as a target subtable to iteratively perform a subsequent procedure (that is, step 11 to step 13) until the quantity of performed disordering procedures reaches the disordering procedure threshold, to obtain the disordered table. In another case, after the disordered subtable corresponding to the target subtable is determined, the disordered table is divided by using a pair of rows to be swapped in the determined at least one pair of rows to be swapped to obtain a plurality of subtables, and the plurality of subtables are used as output tables corresponding to the current round of disordering procedure. Each output table is a target subtable in a next disordering procedure to perform a subsequent procedure until the quantity of performed disordering procedures reaches the disordering procedure threshold, to obtain the disordered table.

Figure 3:
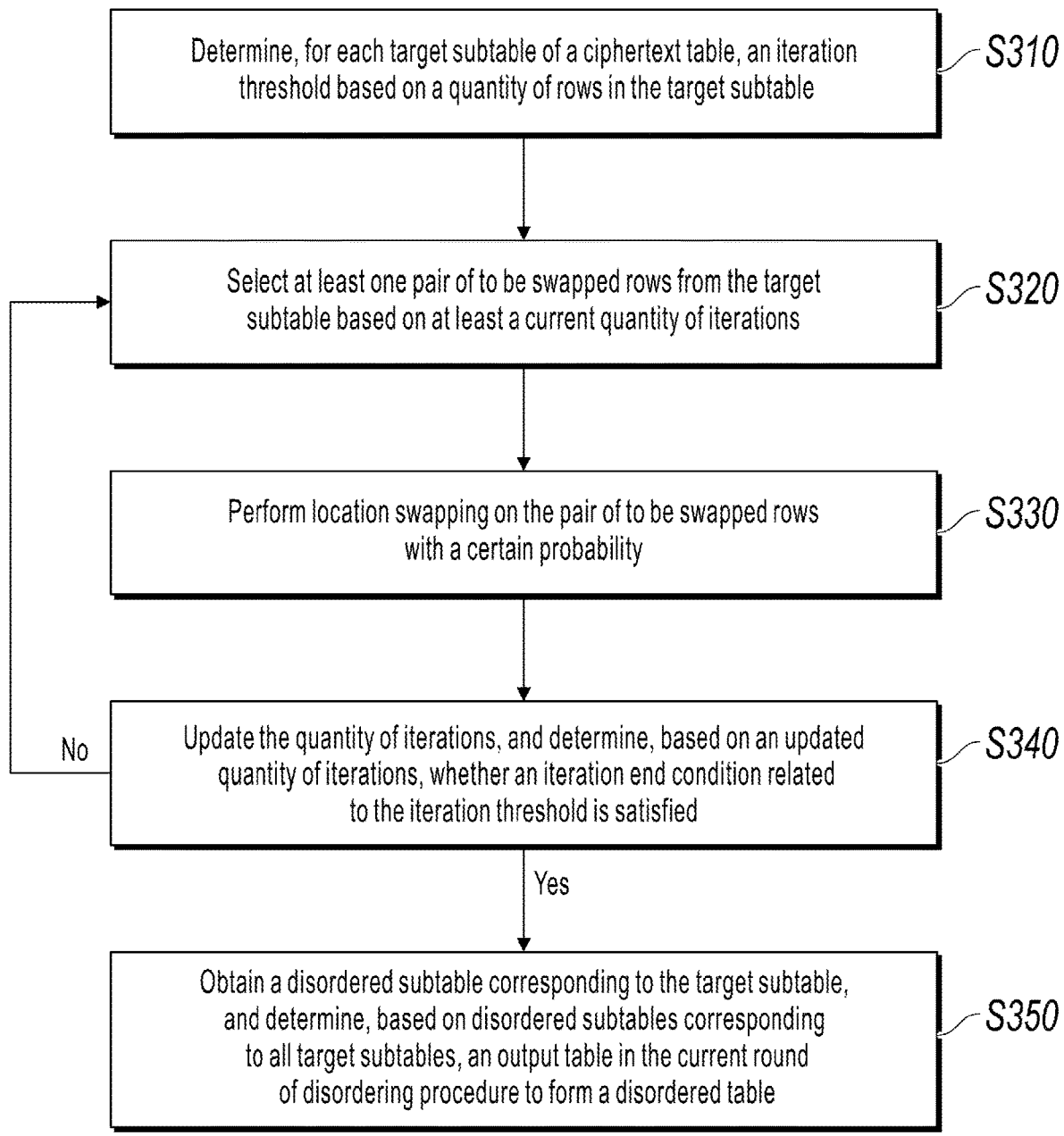
FIG. 3 is a schematic diagram illustrating a process of a disordering procedure, according to one or more embodiments.

In another implementation, any current disordering procedure shown in FIG. 3 can include the following steps:

S310: Determine, for each target subtable of the ciphertext table, an iteration threshold based on a quantity of rows in the target subtable. In a case, a form of the iteration threshold is $2^m$, and m and the quantity n of rows in the target subtable can satisfy the following condition: $2^m < n <= 2^{m+1}$. For each target subtable, the intermediate policy can use the target subtable as a separate table that needs to be disordered, and reconfigure new row numbers for rows included in the target subtable. For example, a row number of a first row in the target subtable is reset to 0 (or 1), and a row number of a subsequent row is incremented by 1.

S320: Select at least one pair of rows to be swapped from the target subtable based on at least a current quantity of iterations.

S330: Perform location swapping on the pair of rows to be swapped with a certain probability.

S340: Update the quantity of iterations, and determine, based on an updated quantity of iterations, whether an iteration end condition related to the iteration threshold is satisfied; and return to perform S320 if it is determined that the iteration end condition related to the iteration threshold is not reached.

S350: If it is determined that the iteration end condition related to the iteration threshold is satisfied, obtain a disordered subtable corresponding to the target subtable, and determine, based on disordered subtables corresponding to all target subtables, an output table in the current round of disordering procedure to form the disordered table.

The determining whether the iteration end condition related to the iteration threshold is satisfied can be as follows: An initial value of a quantity of iterations is 0, and updating the quantity of iterations once is increasing the current quantity of iterations by one. Correspondingly, a quantity of iterations plus one is added reaches the iteration threshold, that is, the iteration end condition related to the iteration threshold is satisfied. Alternatively, the initial value of the quantity of iterations is the iteration threshold, and updating the quantity of iterations once is decreasing the current quantity of iterations by one. Correspondingly, a quantity of iterations obtained minus is 0, that is, the iteration end condition related to the iteration threshold is satisfied.

In an implementation, the intermediate party can select at least one pair of rows to be swapped from the target subtable based on the current quantity of iterations and the iteration threshold. Specifically, the intermediate party can respectively select, from the target subtable, a row whose corresponding row number is equal to the current quantity of iterations and a row whose corresponding row number is equal to a sum of the current quantity of iterations and the iteration threshold as a pair of rows to be swapped.

In an implementation, S350 can be set as follows: The disordered subtable is divided by using the iteration threshold to determine the output table in the current round of disordering procedure. A row whose corresponding row number is the iteration threshold in the disordered subtable corresponding to the target subtable can be directly used as a division reference row, the division reference row in the disordered subtable and rows before the division reference row are used as a new table, and rows after the division reference row are used as a new table, which is used as the output table in the current round of disordering procedure.

In the current disordering procedure, S310 to S350 are performed on all target subtables to obtain all output tables in the current round of disordering procedure. It can be understood that, in the current disordering procedure, after the disordered subtable of each target subtable is divided, if quantities of rows in all new tables obtained after division are less than 2, that is, quantities of rows in all output tables in the current round of disordering procedure are less than 2, the disordered table is directly generated based on the output tables in the current round of disordering procedure.

In an implementation, in the above-mentioned disordering procedure, the intermediate party can record a location relationship between the ciphertext table and each target subtable, and record a location relationship between the disordered subtable corresponding to each target subtable and a new subtable obtained after the disordered subtable is divided. Correspondingly, the intermediate party can determine a location relationship between output tables in each disordering procedure based on the location relationships. After quantities of rows in all the output tables in a round of disordering procedure are less than 2, the disordered table is directly generated based on a location relationship between the output tables in the current round of disordering procedure.

To increase a disordering speed, steps of disordering the target subtables can be performed in parallel in any disordering procedure.

For example, the ciphertext table (Table 1) includes four rows whose row numbers are respectively 0 to 3, and the rows are respectively represented as X[0] to X[3]. X[0] stores attribute item ciphertexts of all attribute items of target object 1, X[1] stores attribute item ciphertexts of all attribute items of target object 2, X[2] stores attribute item ciphertexts of all attribute items of target object 3, and X[3] stores attribute item ciphertexts of all attribute items of target object 4.

In a first disordering procedure, Table 1 is used as a target subtable, and the iteration threshold 2 ($2^1<8<=2^2$) is determined based on a quantity of rows in Table 1; a row (X[0]) whose corresponding row number is equal to a current quantity 0 of iterations and a row (X[2]) whose corresponding row number is equal to a sum of the current quantity 0 of iterations and the iteration threshold 2 are respectively selected from Table 1 as a pair of rows to be swapped; and location swapping is performed on X[0] and X[2] with a certain probability, where the probability of actually swapping locations of X[0] and X[2] is random. If X[0] and X[2] are to be swapped, that is, the attribute item ciphertexts of all the attribute items of target object 3 are stored in X[0], and the attribute item ciphertexts of all the attribute items of target object 1 are stored in X[2].

Next, the quantity of iterations is increased by one, a row (X[1]) whose corresponding row number is equal to the current quantity of iterations 1 and a row (X[3]) whose corresponding row number is equal to a sum of the current quantity of iterations 1 and the iteration threshold 2 are respectively selected from Table 1 as a pair of rows to be swapped, and location swapping is performed on X[1] and X[3] with a certain probability, where whether to actually perform location swapping is random. The quantity of iterations is increased by one (2), so that the iteration end condition (2=2) is satisfied, and a disordered subtable (Table 2) of Table 1 is obtained. In Table 2, attribute values of all attribute items of which target objects are stored in X[0], X[1], X[2], and X[3] are uncertain.

Table 2 is divided based on the iteration threshold 2 to obtain two new subtables, which are respectively Table 3 (including X[0] and X[1]) and Table 4 (including X[2] and X[3]), and the two new subtables are used as output tables in the first round of disordering procedure. Row numbers X[0] and X[1] of the rows in Table 4 (Table 3) are reset, where X[0] corresponds to X[2], and X[1] corresponds to X[3].

In a second round of disordering procedures, Table 3 and Table 4 are respectively used as target subtables, and it is determined that the iteration threshold is 0 based on a quantity 2 of rows in Table 3 (Table 4); a row X[0] (X[0]') whose corresponding row number is equal to the current quantity 0 of iterations and a row X[1] (X[1]') whose corresponding row number is equal to a sum of the current quantity of iterations and the iteration threshold are respectively selected from Table 3 (Table 4) as a pair of rows to be swapped; location swapping is performed on X[0] and X[1] (X[0]' and X[1]') with a certain probability to obtain a disordered subtable corresponding to Table 3, that is, Table 5 (a disordered subtable corresponding to Table 4, that is, Table 6); Table 5 (Table 6) is divided based on the iteration threshold 0 to obtain two new subtables, which are respectively Table 7 and Table 8 (Table 9 and Table 10), and the two new subtables are used as output tables in the second round of disordering procedure, where quantities of rows in both output tables in the second round of disordering procedures are 1 and less than 2; and the disordered table is generated based on the output tables in the second round of disordering procedures.

Figure 4:
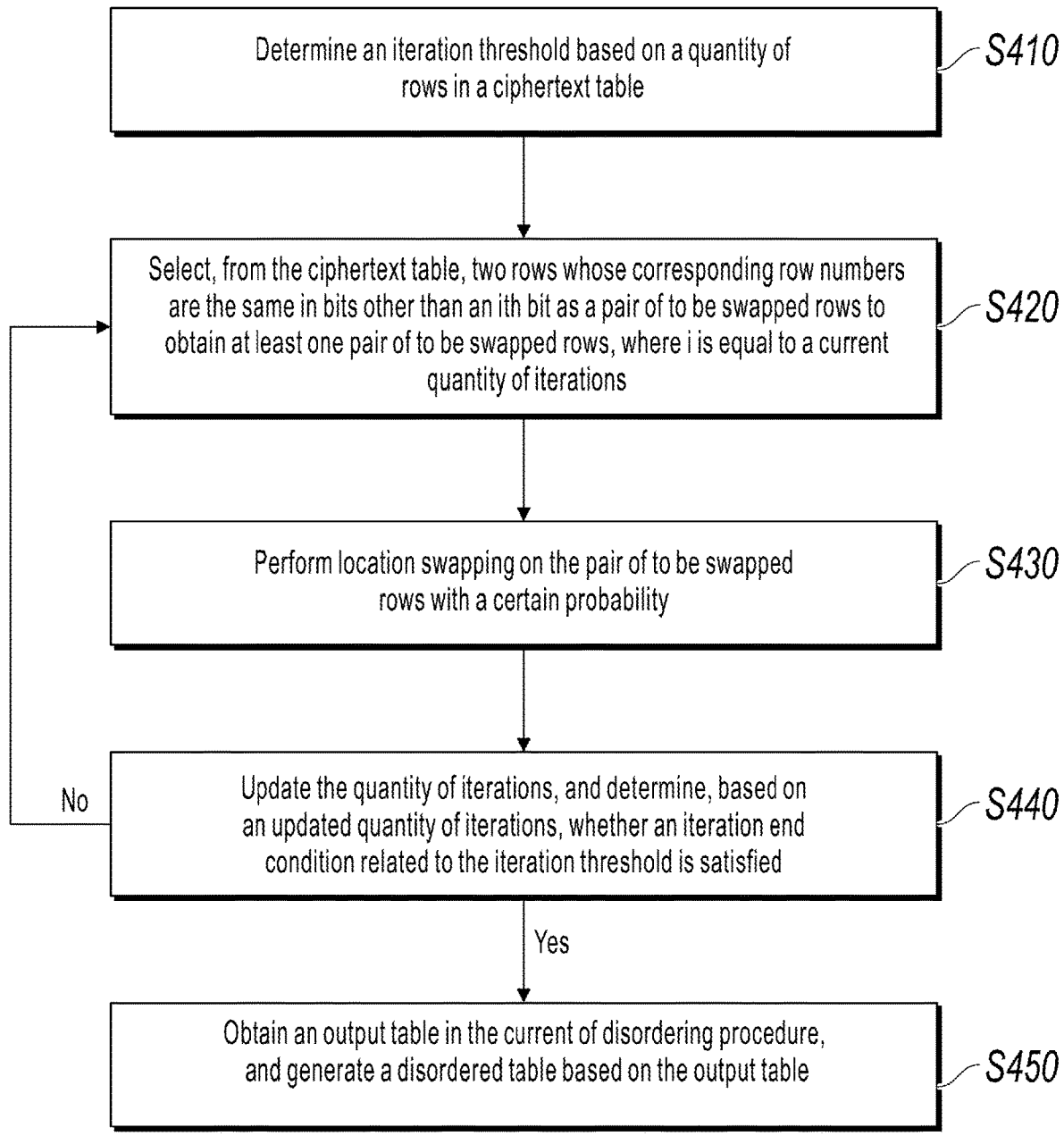
FIG. 4 is a schematic diagram illustrating a process of a disordering procedure, according to one or more embodiments.

In another implementation, as shown in FIG. 4, any current disordering procedure can include the following step S410 to step S450:

S410: Determine an iteration threshold based on a quantity of rows in the ciphertext table, where in a case, a form of the iteration threshold is $2^m$, and m and the quantity n of rows in the target subtable can satisfy the following condition: $2^m<n<=2^{m+1}$.

S420: Select, from the ciphertext table, two rows whose corresponding row numbers are the same in bits other than an $i^{th}$ bit as a pair of rows to be swapped to obtain at least one pair of rows to be swapped, where i is equal to a current quantity of iterations.

S430: Perform location swapping on each pair of rows to be swapped with a certain probability, where the certain probability is determined based on a random number generated for corresponding rows to be swapped.

S440: Update the quantity of iterations, and determine, based on an updated quantity of iterations, whether an iteration end condition related to the iteration threshold is satisfied; and return to perform S420 if it is determined that the iteration end condition related to the iteration threshold is not reached.

S450. If it is determined that the iteration end condition related to the iteration threshold is satisfied, obtain an output table in the current round of disordering procedure, and generate the disordered table based on the output table.

In the embodiments, a row number of each row in the ciphertext table is represented in a binary way, and a specific quantity of binary bits can be set based on an actual situation, for example, 4 bits and 8 bits. In a case of 4 bits, for example, a row number corresponding to the first row X[0] can be represented as 0000, a row number corresponding to the second row X[1] can be represented as 0001, and so on.

After the iteration threshold is determined, a value range of the quantity i of iterations can be set to an integer in [0, m−1], where i can be valued from 0. Correspondingly, updating the quantity of iterations is increasing the current quantity of iterations by one, and that the iteration end condition related to the iteration threshold is satisfied means that an updated quantity of iterations reaches the iteration threshold. In another case, i can be valued from m−1. In this case, updating the quantity of iterations is decreasing the current quantity of iterations by one, and that the iteration end condition related to the iteration threshold is satisfied means that an updated quantity of iterations is 0.

In an implementation, to increase a disordering speed, steps of performing location swapping on pairs of rows to be swapped can be performed in parallel in any disordering procedure.

Figure 5:
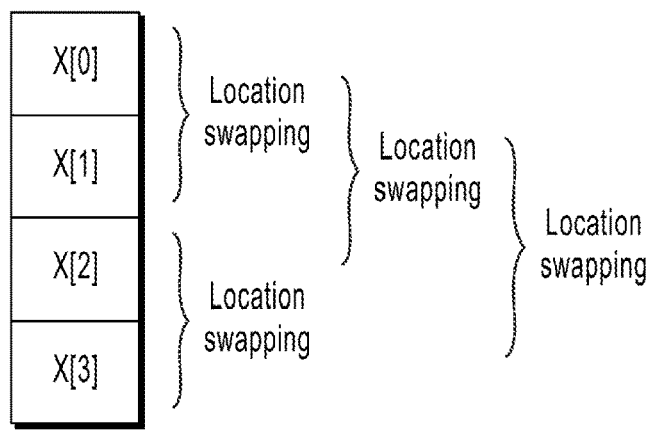
FIG. 5 is a schematic diagram illustrating a disordering scenario, according to one or more embodiments.

As shown in FIG. 5, description is provided by using an example that the ciphertext table (the target subtable) includes four rows. Row numbers corresponding to the four rows are respectively represented as follows: A row number corresponding to a first line X[0] is 0000, a row number corresponding to a second line X[1] is 0001, a row number corresponding to a third line X[2] is 0010, and a row number corresponding to a fourth line X[3] is 0011. The iteration threshold is 2, and correspondingly, i can be 0 or 1. When i is equal to 0, two rows whose corresponding row numbers are the same in bits other than a $0^{th}$ bit are selected from the ciphertext table as a pair of rows to be swapped to obtain at least one pair of rows to be swapped. Specifically, the first row X[0] and the second row X[1] are a pair of rows to be swapped, and the third row X[2] and the fourth row X[3] are a pair of rows to be swapped.

Location swapping is performed on the first row X[0] and the second row X[1] with a certain probability, and location swapping is performed on the third row X[2] and the fourth row X[3] with a certain probability, to obtain an intermediate sorted table, where a location relationship between the rows is rearranged.

Then, i is updated, and an updated i is equal to 1. Two rows whose corresponding row numbers are the same in bits other than the first bit are selected from the intermediate sorted table (a result of the above-mentioned iteration) as a pair of rows to be swapped to obtain at least one pair of rows to be swapped. Specifically, the first row X[0] and the third row X[2] are a pair of rows to be swapped, and the second row X[1] and the fourth row X[3] are a pair of rows to be swapped. Location swapping is performed on the first row X[0] and the third row X[2] with a certain probability, and location swapping is performed on the second row X[1] and the fourth row X[3] with a certain probability.

Then, i is updated, and an updated i is equal to 2, so that the iteration end condition is satisfied, and the disordered table is obtained.

In the embodiments, the ciphertext table can be disordered by using one disordering procedure to scramble an order relationship between the rows in the table, so that locations of the rows in the table cannot be tracked during each time of sorting, thereby avoiding exposure of an order relationship between the rows in the table in a sorting sequence (for example, a target object ranks at an $a^{th}$ location in a sorting sequence of a first attribute item is a target object ranks at a $b^{th}$ location in a sorting sequence of a second attribute item).

In an implementation of this specification, to better disorder the ciphertext table, S220 can include the following step 21 and step 22:

Step 21: Determine whether a total quantity of rows in the ciphertext table satisfies a predetermined disordering condition, where the predetermined disordering condition includes: a total quantity of rows is equal to an integer power of a predetermined value, where the predetermined value can be set based on an actual situation, and the predetermined value is 2 in a case.

Step 22: Disorder the ciphertext table in units of rows if it is determined that the predetermined disordering condition is satisfied. When the total quantity of rows in the ciphertext table satisfies the predetermined disordering condition, probabilities that the rows in the ciphertext table are determined as one row in a pair of rows to be swapped are equal to a certain extent, to avoid that probabilities that location swapping is performed on some rows is very small, affecting a disordering effect to a certain extent. For example, the ciphertext table includes five rows. When the disordering procedure shown in FIG. 3 is used, a fifth row may not participate in disordering, and there is a risk, to a certain extent, that some private data of a target object stored in the fifth row is leaked. To reduce an occurrence probability of the above-mentioned case and improve a disordering effect, when the intermediate party determines that the ciphertext table satisfy the predetermined disordering condition, S220 can further include step 23 and step 24: Step 23: Fill the ciphertext table with a specific row to obtain a filled table, where a total quantity of rows in the filled table satisfies the predetermined disordering condition. Step 24: Disorder the filled table in units of rows to obtain the disordered table. A row number corresponding to the specific row is different from a row number of each row in the ciphertext table, and the specific row can include a ciphertext of a specified type of data.

Subsequently, after the filled table filled with the specific row is disordered to obtain the disordered table corresponding to the filled table, in response to a query instruction of querying sorting-related data for a target attribute item, attribute value ciphertexts corresponding to the target attribute item in the disordered table are sorted to obtain a sorted table, and the specific row filled in the sorted table is removed to obtain a target sorted table.

In another implementation, when it is determined that the ciphertext table does not satisfy the predetermined disordering condition, after the disordered table is disordered in units of rows, rows (for example, rows whose corresponding row numbers are greater than $2^m$) participating in a relatively small quantity of disordering procedures are determined, and rows of this type are disordered randomly. For example, random disordering is performed between the rows of this type, or the rows of this type are randomly inserted into other rows (for example, the rows of this type are randomly inserted into rows whose corresponding row numbers are not greater than $2^m$ in the table), to better disorder an order relationship between rows before and after the rows of this type.

In the embodiments of this specification, the intermediate party can sort the attribute value ciphertexts of the target attribute items in the disordered table by using a plurality of sorting algorithms, for example, a merge sorting algorithm or a heapsorting algorithm. One or more embodiments of this specification provides a sorting method. Specifically, S240 can include: A plurality of sorting procedures are iteratively performed, where any sorting procedure includes the following step 31 to step 33:

Step 31: For each table part currently to be sorted in the disordered table, a reference ciphertext is determined from attribute value ciphertexts corresponding to the target attribute item included in the table part.

Step 32: Group other attribute value ciphertexts included in the table part based on the reference ciphertext, to obtain a first row set larger than the reference ciphertext and a second row set smaller than the reference ciphertext.

Step 33: Use a set whose quantity of rows is greater than 1 in the first row set and the second row set corresponding to each table part is used as a table part to be sorted corresponding to a next sorting procedure, until the target sorted table is obtained. In a case, the target sorted table can be obtained when quantities of rows in both the first row set and the second row set corresponding to each table part to be sorted are not greater than 1.

In an implementation, after obtaining the disordered table, the intermediate party iteratively performs a plurality of sorting procedures on the disordered table in response to the query instruction. In a first sorting procedure, the intermediate party uses the disordered table as a current table part to be sorted, and determines one attribute value ciphertext as a reference ciphertext from attribute value ciphertexts corresponding to the target attribute item included in the table part; compares the reference ciphertext with other attribute value ciphertexts of the target attribute item object to obtain a comparison result; and further, groups the other attribute value ciphertexts corresponding to the target attribute item included in the table part based on the comparison result, to obtain a first row set greater than the reference ciphertext and a second row set less than the reference ciphertext. The first row set includes a row including another attribute value ciphertext of the target attribute item object that is larger than the reference ciphertext in the table part, and the second row set includes a row including another attribute value ciphertext of the target attribute item object that is smaller than the reference ciphertext in the table part.

The intermediate party uses a set whose quantity of rows is greater than 1 in the first row set and the second row set corresponding to the table part as a table part to be sorted corresponding to a next sorting procedure, and returns to perform step 31 to step 33 until quantities of rows in both the first row set and the second row set corresponding to each table part to be sorted are not greater than 1, to obtain the target sorted table.

In a case, a third row set equal to the reference ciphertext is further obtained through the grouping. The third row set includes a row including another attribute value ciphertext of the target attribute item object that is equal to the reference ciphertext in the table part. Rows in the third row set do not need to be sorted for the target attribute item.

In an implementation of this specification, the any sorting procedure can further include: arranging the first row set, the second row set, and the third row set corresponding to each table part, so that the first row set is placed below the third row set, and the second row set is placed above the third row set. The first row set, the second row set, and the third row set corresponding to each table part are placed based on the arrangement, so that the rows in the disordered table can be sorted in ascending order of the attribute value ciphertexts corresponding to the target attribute item. In another implementation, the any sorting procedure can further include: ranging the first row set, the second row set, and the third row set corresponding to each table part, where the first row set is placed above the third row set, and the second row set is placed below the third row set, so that the rows in the disordered table are sorted in ascending order of the attribute value ciphertexts corresponding to the target attribute item.

To increase a sorting speed, sorting of table parts can be performed in parallel in any sorting procedure.

Some specific embodiments of this specification have been described above, and other embodiments fall within the scope of the appended claims. In some cases, actions or steps described in the claims can be performed in a sequence different from that in the embodiments and desired results can still be achieved. In addition, processes described in the accompanying drawings do not necessarily need a specific order or a sequential order shown to achieve the desired results. In some implementations, multitasking and parallel processing are also feasible or may be advantageous.

Figure 6:
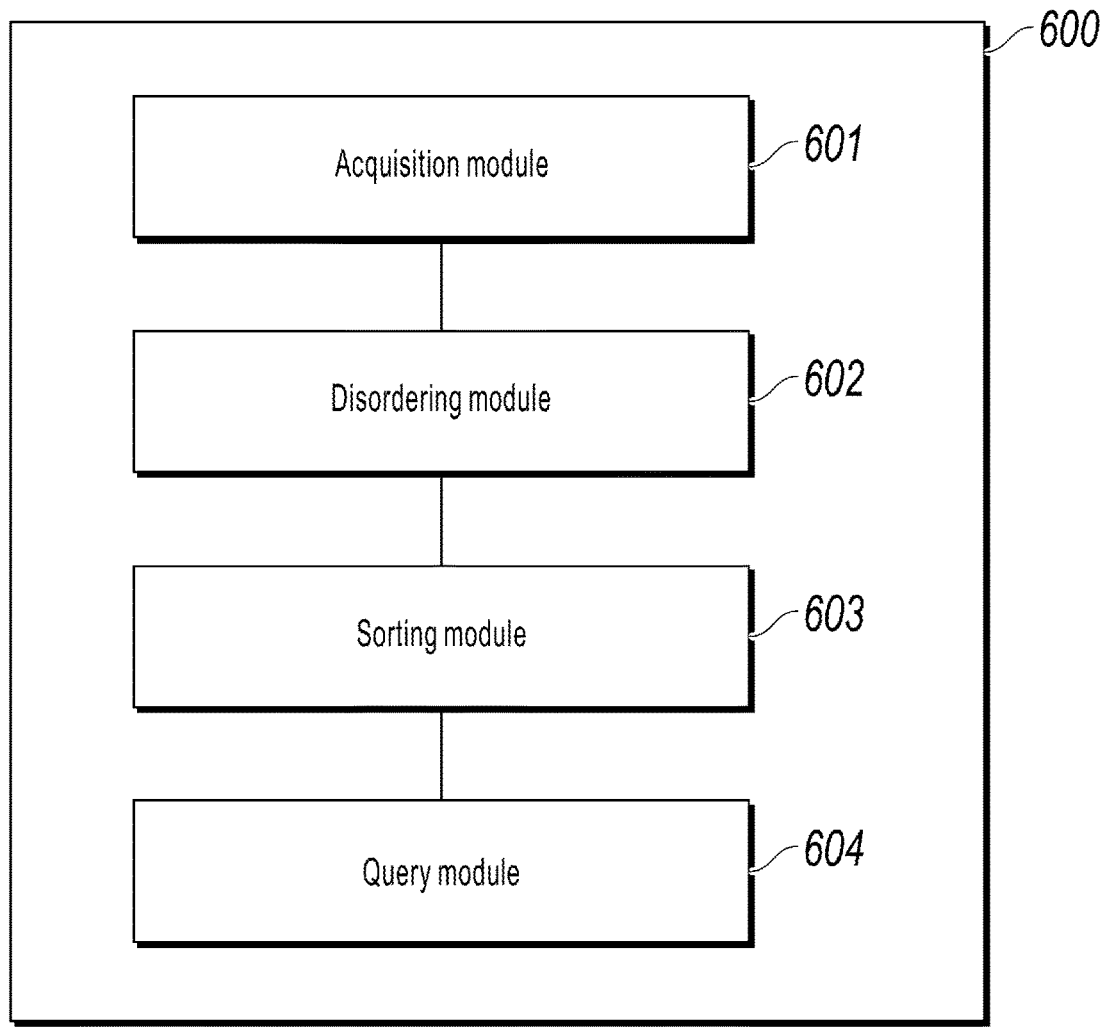
FIG. 6 is a schematic block diagram illustrating a multi-party data query apparatus for data privacy protection, according to one or more embodiments.

Corresponding to the above-mentioned method embodiments, one or more embodiments of this specification provide a multi-party data query apparatus 600 for data privacy protection. The multi-party includes a plurality of data owners, each of the plurality of data owners holds attribute values of several attribute items of N target objects, and the apparatus is deployed in an intermediate party other than the multi-party. A schematic block diagram of the apparatus is shown in FIG. 6, and the apparatus includes: an acquisition module 610, configured to obtain attribute value ciphertexts of the N target objects sent by each data owner to obtain a ciphertext table, where one row in the ciphertext table corresponds to one target object, and one column corresponds to one attribute item; a disordering module 620, configured to disorder the ciphertext table in units of rows to obtain a disordered table; a sorting module 630, configured to sort, in response to a query instruction of querying sorting-related data for a target attribute item, attribute value ciphertexts corresponding to the target attribute item in the disordered table to obtain a target sorted table; and a query module 640, configured to obtain the sorting-related data as a query result based on the target sorted table.

In an optional implementation, the intermediate party is a cryptographic computing system including M executors.

The acquisition module 610 is specifically configured to be used by each of the M executors to obtain one attribute value fragment sent by each data owner as an attribute value ciphertext, where each attribute value fragment is determined by dividing, by each data owner, an attribute value held by the data owner into M pieces.

The disordering module 620 is specifically configured to be used by each executor to disorder, in combination with the other (M−1) executors, the ciphertext table in units of rows based on the attribute value ciphertext held by the party by using a secure multi-party computation (MPC) solution.

In an optional implementation, the sorting-related data are a calculation result of performing specified calculation on attribute value ciphertexts at specified X locations in a sorting sequence corresponding to the target attribute item.

The query module 640 is specifically configured to obtain target attribute value ciphertexts at the specified X locations from the target sorted table; and perform the specified calculation on the target attribute value ciphertexts.

In an optional implementation, the disordering module 620 is specifically configured to disorder the ciphertext table by using at least one disordering procedure, where the disordering module 620 performs any current disordering procedure by using the following units: a first determining unit (not shown in the figure), configured to determine, for each target subtable of the ciphertext table, at least one pair of rows to be swapped from the target subtable; a location swapping unit (not shown in the figure), configured to perform location swapping on each pair of rows to be swapped with a certain probability to obtain a disordered subtable corresponding to the target subtable; and a second determining unit (not shown in the figure), configured to determine an output table in the current round of disordering procedure based on the disordered subtable to form the disordered table.

In an optional implementation, the certain probability is determined based on a random number generated for the pair of rows to be swapped.

In an optional implementation, when the current disordering procedure is a first disordering procedure, the target subtable is the ciphertext table; and when the current disordering procedure is not the first disordering procedure, the target subtable is a table whose quantity of rows is not less than 2 in an output table corresponding to an above-mentioned disordering procedure.

In an optional implementation, the first determining unit is specifically configured to determine an iteration threshold based on a quantity of rows in the target subtable; and iteratively perform a plurality of iteration processes, where each iteration process includes: selecting at least one pair of rows to be swapped from the target subtable based on at least a current quantity of iterations until an iteration end condition related to the iteration threshold is satisfied.

In an optional implementation, the first determining unit is specifically configured to respectively select, from the target subtable, a row whose corresponding row number is equal to the current quantity of iterations and a row whose corresponding row number is equal to a sum of the current quantity of iterations and the iteration threshold as a pair of rows to be swapped.

In an optional implementation, the second determining unit is specifically configured to divide the disordered subtable by using the iteration threshold to determine the output table in the current round of disordering procedure.

In an optional implementation, a form of the iteration threshold is $2^m$, and m and the quantity n of rows in the target subtable satisfy the following condition: $2^m < n <= 2^{m+1}$.

In an optional implementation, a row number corresponding to each row in the ciphertext table is represented in a binary way.

The first determining unit is specifically configured to select, from the target subtable, two rows whose corresponding row numbers are the same in bits other than an $i^{th}$ bit, where i is equal to the current quantity of iterations, and the target subtable is the ciphertext table.

In an optional implementation, the sorting module 630 is specifically configured to iteratively perform a plurality of sorting procedures, where any sorting procedure includes: determining, for each table part currently to be sorted in the disordered table, a reference ciphertext from attribute value ciphertexts corresponding to the target attribute item included in the table part; grouping other attribute value ciphertexts corresponding to the target attribute item included in the table part based on the reference ciphertext, to obtain a first row set larger than the reference ciphertext and a second row set smaller than the reference ciphertext; and using a set whose quantity of rows is greater than 1 in the first row set and the second row set corresponding to each table part as a table part to be sorted corresponding to a next sorting procedure, until the target sorted table is obtained.

In an optional implementation, a third row set equal to the reference ciphertext is further obtained through the grouping.

In an optional implementation, the sorting module 630 is further specifically configured to arrange the first row set, the second row set, and the third row set corresponding to each table part, so that the first row set is placed below the third row set, and the second row set is placed above the third row set.

In an optional implementation, the disordering module 620 includes: a determining unit (not shown in the figure), configured to determine whether a total quantity of rows in the ciphertext table satisfies a predetermined disordering condition, where the predetermined disordering condition includes: a total quantity of rows is equal to an integer power of a predetermined value; a filling unit (not shown in the figure), configured to fill the ciphertext table with a specific row to obtain a filled table if it is determined that the predetermined disordering condition is not satisfied, where a total quantity of rows in the filled table satisfies the predetermined disordering condition; and a disordering unit (not shown in the figure), configured to disorder the filled table in units of rows to obtain the disordered table.

In an optional implementation, the sorting module 630 is specifically configured to: sort the attribute value ciphertexts corresponding to the target attribute item in the disordered table to obtain a sorted table; and remove the specific row filled in the sorted table to obtain the target sorted table.

The above-mentioned apparatus embodiments correspond to the method embodiments. For detailed description, references can be made to the description of the method embodiments, and details are omitted here for simplicity. The apparatus embodiments are obtained based on the corresponding method embodiments, and have the same technical effects as the corresponding method embodiments. For detailed description, references can be made to the corresponding method embodiments.

One or more embodiments of this specification further provide a computer-readable storage medium. The computer-readable storage medium stores a computer program, and when the computer program is executed in a computer, the computer is enabled to perform the multi-party data query method for private data protection provided in this specification.

One or more embodiments of this specification further provide a computing device, including a memory and a processor. The memory stores executable code, and the processor executes the executable code to implement the multi-party data query method for private data protection provided in this specification.

The embodiments in this specification are described in a progressive way. For same or similar parts of the embodiments, mutual references can be made to the embodiments. Each embodiment focuses on a difference from other embodiments. Particularly, the storage medium and computing device embodiments are basically similar to the method embodiments, and therefore are described briefly. For related parts, references can be made to the descriptions in the method embodiments.

A person skilled in the art should be aware that in the above-mentioned one or more examples, functions described in the embodiments of this application can be implemented by hardware, software, firmware, or any combination thereof. When implemented by software, these functions can be stored in a computer-readable medium or transmitted as one or more instructions or code on a computer-readable medium.

The above-mentioned specific implementations further describe in detail the objectives, technical solutions, and beneficial effects of the embodiments of this application. It should be understood that, the above-mentioned descriptions are merely specific implementations of the embodiments of this application, and are not intended to limit the protection scope of this application. Any modification, equivalent replacement, or improvement made based on the technical solutions in this application shall fall within the protection scope of this application.

The invention claimed is:

1. A method for data privacy protection, wherein the method comprises:
obtaining, from each of a plurality of data owners, attribute value ciphertexts of N target objects to form a ciphertext table, wherein each row in the ciphertext table corresponds to one of the N target objects, and each column in the ciphertext table corresponds to one of a plurality of attribute items of the N target objects, where N is a natural number;
disordering the ciphertext table in units of rows to obtain a disordered table;
sorting, in response to a query instruction of querying sorting-related data for a target attribute item in the plurality of attribute items, attribute value ciphertexts corresponding to the target attribute item in the disordered table to obtain a target sorted table;
sorting the attribute value ciphertexts corresponding to the target attribute item in the disordered table to obtain a sorted table;
removing a predetermined row filled in the sorted table to obtain the target sorted table; and
obtaining the sorting-related data as a query result based on the target sorted table.

2. The method according to claim 1, wherein the method is performed by a cryptographic computing system comprising M executors, where M is a natural number; wherein
the obtaining attribute value ciphertexts of the N target objects comprises:
obtaining, by each of the M executors, an attribute value fragment sent by each of the plurality of data owners as an attribute value ciphertext, wherein the attribute value fragment is determined based on dividing, by the respective data owner, an attribute value held by the respective data owner into M pieces; and wherein
the disordering the ciphertext table in units of rows comprises:
disordering, by the M executors, the ciphertext table in units of rows based on the attribute value ciphertext held by the respective executor based on a secure multi-party computation (MPC) solution.

3. The method according to claim 1, wherein the sorting-related data is a calculation result of performing calculation on attribute value ciphertexts at X locations in a sorting sequence corresponding to the target attribute item, where X is a natural number; and
the obtaining the sorting-related data as a query result comprises:
obtaining target attribute value ciphertexts at the X locations from the target sorted table; and
performing the calculation on the target attribute value ciphertexts.

4. The method according to claim 1, wherein the disordering the ciphertext table in units of rows comprises:
disordering the ciphertext table by using at least one disordering procedure, wherein a current disordering procedure of the at least one disordering procedure comprises:

determining, for each target subtable of the ciphertext table, at least one pair of rows to be swapped from the target subtable;
performing location swapping on each pair of rows of the ciphertext table to be swapped based on a predetermined probability to obtain a disordered subtable corresponding to the target subtable; and
determining an output table in the current disordering procedure based on the disordered subtable to form the disordered table.

5. The method according to claim 4, wherein the predetermined probability is determined based on a random number generated for the pair of rows to be swapped.

6. The method according to claim 4, wherein when the current disordering procedure is a first disordering procedure, the target subtable is the ciphertext table, and when the current disordering procedure is not the first disordering procedure, the target subtable is a table having a quantity of rows greater than or equal to 2 in an output table corresponding to the current disordering procedure.

7. The method according to claim 4, wherein the determining at least one pair of rows to be swapped from the target subtable comprises:
determining an iteration threshold based on a quantity of rows in the target subtable; and
iteratively performing a plurality of iteration processes, wherein each of the plurality of iteration processes comprises:
selecting at least one pair of rows to be swapped from the target subtable based on a current quantity of iterations until an iteration end condition related to the iteration threshold is satisfied.

8. The method according to claim 7, wherein the selecting at least one pair of rows to be swapped from the target subtable comprises:
selecting, from the target subtable, a row with a row number that equals to the current quantity of iterations and a row with a row number that equals to a sum of the current quantity of iterations and the iteration threshold as a pair of rows to be swapped.

9. The method according to claim 7, wherein the determining an output table in the current disordering procedure comprises:
dividing the disordered subtable based on the iteration threshold to determine the output table in the current disordering procedure.

10. The method according to claim 7, wherein a form of the iteration threshold is $2^m$, and m and the quantity of rows in the target subtable satisfy: $2^m < n <= 2^{m+1}$, where n represents the quantity of rows.

11. The method according to claim 7, wherein a row number corresponding to each row in the ciphertext table is represented as a binary number, and wherein
the selecting at least one pair of rows to be swapped from the target subtable comprises:
selecting, from the target subtable, two rows with corresponding row numbers that are same in bits but other than an $i^{th}$ bit as a pair of rows to be swapped, wherein i is equal to the current quantity of iterations, and the target subtable is the ciphertext table.

12. The method according to claim 1, wherein the sorting attribute value ciphertexts corresponding to the target attribute item in the disordered table comprises:
iteratively performing a plurality of sorting procedures, wherein a sorting procedure of the plurality of sorting procedures comprises:

determining, for each table part to be sorted in the disordered table, a reference ciphertext from attribute value ciphertexts corresponding to the target attribute item comprised in the table part;

grouping, based on the reference ciphertext, attribute value ciphertexts corresponding to the target attribute item comprised in the table part other than the reference ciphertext, to obtain a first row set larger than the reference ciphertext and a second row set smaller than the reference ciphertext; and using a set with quantity of rows greater than 1 in the first row set and the second row set corresponding to each table part as a table part to be sorted corresponding to a next sorting procedure, until the target sorted table is obtained.

13. The method according to claim 12, wherein a third row set equal to the reference ciphertext is further obtained based on the grouping the attribute value ciphertexts.

14. The method according to claim 13, wherein the sorting procedure further comprises:

arranging the first row set, the second row set, and the third row set corresponding to each table part, so that the first row set is placed below the third row set, and the second row set is placed above of the third row set.

15. The method according to claim 1, wherein the disordering the ciphertext table in units of rows comprises:

determining whether a total quantity of rows in the ciphertext table satisfies a predetermined disordering condition, wherein the predetermined disordering condition comprises: a total quantity of rows is equal to an integer power of a predetermined value;

filling the ciphertext table with the predetermined row to obtain a filled table in response to determining that the predetermined disordering condition is not satisfied, wherein a total quantity of rows in the filled table satisfies the predetermined disordering condition; and disordering the filled table in units of rows to obtain the disordered table.

16. A non-transitory, computer-readable medium storing one or more instructions executable by a computer system to perform operations comprising:

obtaining, from each of a plurality of data owners, attribute value ciphertexts of N target objects to form a ciphertext table, wherein each row in the ciphertext table corresponds to one of the N target objects, and each column in the ciphertext table corresponds to one of a plurality of attribute items of the N target objects, where N is a natural number;

disordering the ciphertext table in units of rows to obtain a disordered table;

sorting, in response to a query instruction of querying sorting-related data for a target attribute item in the plurality of attribute items, attribute value ciphertexts corresponding to the target attribute item in the disordered table to obtain a target sorted table;

sorting the attribute value ciphertexts corresponding to the target attribute item in the disordered table to obtain a sorted table;

removing a predetermined row filled in the sorted table to obtain the target sorted table; and obtaining the sorting-related data as a query result based on the target sorted table.

17. The non-transitory, computer-readable medium according to claim 16, wherein the operations are performed by a cryptographic computing system comprising M executors, where M is a natural number; wherein the obtaining attribute value ciphertexts of the N target objects comprises:

obtaining, by each of the M executors, an attribute value fragment sent by each of the plurality of data owners as an attribute value ciphertext, wherein the attribute value fragment is determined based on dividing, by the respective data owner, an attribute value held by the respective data owner into M pieces; and wherein the disordering the ciphertext table in units of rows comprises:

disordering, by the M executors, the ciphertext table in units of rows based on the attribute value ciphertext held by the respective executor based on a secure multi-party computation (MPC) solution.

18. The non-transitory, computer-readable medium according to claim 16, wherein the sorting-related data is a calculation result of performing calculation on attribute value ciphertexts at X locations in a sorting sequence corresponding to the target attribute item, where X is a natural number; and the obtaining the sorting-related data as a query result comprises:

obtaining target attribute value ciphertexts at the X locations from the target sorted table; and performing the calculation on the target attribute value ciphertexts.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, from each of a plurality of data owners, attribute value ciphertexts of N target objects to form a ciphertext table, wherein each row in the ciphertext table corresponds to one of the N target objects, and each column in the ciphertext table corresponds to one of a plurality of attribute items of the N target objects, where N is a natural number;

disordering the ciphertext table in units of rows to obtain a disordered table;

sorting, in response to a query instruction of querying sorting-related data for a target attribute item in the plurality of attribute items, attribute value ciphertexts corresponding to the target attribute item in the disordered table to obtain a target sorted table;

sorting the attribute value ciphertexts corresponding to the target attribute item in the disordered table to obtain a sorted table;

removing a predetermined row filled in the sorted table to obtain the target sorted table; and obtaining the sorting-related data as a query result based on the target sorted table.

* * * * *